US012694183B1

(12) United States Patent　(10) Patent No.: US 12,694,183 B1
Geb et al.　(45) Date of Patent: Jul. 28, 2026

(54) MULTISCALE THERMAL REDUCED ORDER MODEL FOR TRANSIENT IC ANALYSIS

(71) Applicant: ANSYS, INC., Canonsburg, PA (US)

(72) Inventors: David Geb, Walnut Creek, CA (US);
Saeed Asgari, Westborough, MA (US);
Akhilesh Kumar, Milpitas, CA (US);
Jimin Wen, Pleasanton, CA (US);
Norman Chang, Fremont, CA (US);
Hsiming Pan, San Jose, CA (US);
Mehdi Abarham, Belmont, CA (US);
Haiyang He, Washington, PA (US);
Viralkumar Girishchandra Gandhi,
Nashua, NH (US)

(73) Assignee: ANSYS, INC., Canonsburg, PA (US)

( * ) Notice: Subject to any disclaimer, the term of this patent is extended or adjusted under 35 U.S.C. 154(b) by 1066 days.

(21) Appl. No.: 17/659,343

(22) Filed: Apr. 15, 2022

Related U.S. Application Data

(60) Provisional application No. 63/253,363, filed on Oct. 7, 2021.

(51) Int. Cl.
*G06F 30/367* (2020.01)
*G06F 30/28* (2020.01)
(Continued)

(52) U.S. Cl.
CPC ............ *G06F 30/367* (2020.01); *G06F 30/28* (2020.01); *G06F 30/373* (2020.01); *G06F 2113/18* (2020.01); *G06F 2119/08* (2020.01)

(58) Field of Classification Search
CPC ........ G06F 30/30; G06F 30/36; G06F 30/367; G06F 30/373; G06F 30/28; G06F 2113/18; G06F 2119/08
See application file for complete search history.

(56) References Cited

U.S. PATENT DOCUMENTS

| | | | |
|---|---|---|---|
| 7,401,304 B2 * | 7/2008 | Li | G06F 30/367 716/111 |
| 8,539,408 B1 * | 9/2013 | Cheng | G06F 30/367 716/110 |
| 10,896,279 B2 * | 1/2021 | Proulx | G06F 30/367 |

OTHER PUBLICATIONS

Dey, A., et al. "Lumped Parameter Thermal Network Modelling of Power Transformers" IEEE 20th Intersociety Conf. on Thermal & Thermomechanical Phenomena in Electronic Systems (Jun./Aug. 2021) available from <https://ieeexplore.ieee.org/abstract/document/9503171> (Year: 2021).*

(Continued)

*Primary Examiner* — Jay Hann
(74) *Attorney, Agent, or Firm* — WOMBLE BOND DICKINSON (US) LLP

(57) ABSTRACT

In one embodiment, several reduced order models (ROMs), each at a different scale, are developed to create a multiscale ROM for a given system, which can include one or more integrated circuits (ICs), for simulating thermal responses (e.g., heating in the ICs and the system) as a result of usage scenarios of the IC and system (in which power is applied on the IC and in the system) over time. An IC, package and system can be thermally characterized to determine transient temperature response to a power source in each IC; this characterization can use simulations of the power source to simulate temperature responses at points in the IC, package and system, and these responses provide a set of thermal training data. An algorithm generates a linear time-invariant (LTI) state-space thermal macromodel or ROM at each of the different scales on-chip and in system, from the set of thermal step response training data, and combines them into a multiscale ROM, which can be distributed and solved on many CPUs. When the multiscale ROM is used, power accounting can be used across the scales to conserve power. On IC symmetry and inverse heat transfer properties can be (Continued)

DEFINE A SET OF SCALES (AKA LEVELS) THAT COVER DIFFERENT RESOLUTIONS OF EACH IC IN A SET OF ONE OR MORE ICs IN A SYSTEM THAT INCLUDES THE SET OF ICs AND DEFINE A SET OF TILES (E.G., M x M TILES) FOR EACH SCALE — 51

PERFORM THERMAL CHARACTERIZATION OF ICs, PACKAGE AND SYSTEM (E.G., SIMULATE NOMINAL POWER APPLIED TO A SINGLE TILE AT EACH ON-CHIP SCALE USING CFD/FEA SIMULATIONS TO GENERATE A SET OF THERMAL TRANSIENT RESPONSE TRAINING DATA) — 53

GENERATE, FOR EACH OF THE SCALES, A MODEL (E.G., A LTI ROM) FROM THE GENERATED SET OF THERMAL TRANSIENT RESPONSE TRAINING DATA. COMBINE INDIVIDUAL ROMS AT EACH SCALE INTO A SINGLE MULTISCALE ROM — 55

RECEIVE POWER PROFILE DATA FOR ICs AND SYSTEM (POWER PROFILE MAY INCLUDE TIME VARYING USING SCENARIOS OF THE SYSTEM) AND PERFORM MULTISCALE POWER ACCOUNTING — 57

GENERATE, FROM THE POWER PROFILE DATA, THERMAL DATA (E.G., TEMPERATURES OVER TIME) AS OUTPUTS FROM THE MULTISCALE ROM — 59

EVALUATE THE MULTISCALE ROM FOR EACH POINT OF INTEREST ON THE IC — 61 used to reduce the amount of thermal characterization operations.

20 Claims, 17 Drawing Sheets

(51) Int. Cl.
  *G06F 30/373* (2020.01)
  *G06F 113/18* (2020.01)
  *G06F 119/08* (2020.01)

(56) References Cited

OTHER PUBLICATIONS

Lasance, C. "Ten Years of Boundary-Condition-Independent Compact Thermal Modeling of Electronic Parts: A Review" Heat Transfer Engineering, vol. 29, No. 2, pp. 149-168 (2008) (Year: 2008).*

Hassan, Z., et al. "Multiscale Thermal Analysis for Nanometer-Scale Integrated Circuits" IEEE Transactions on CAD of IC & Sys., vol. 28, No. 6 (2009) (Year: 2009).*

Barabadi, B., et al. "Multiscale Transient Thermal Analysis of Microelectronics" J. Electronic Packaging, vol. 137 (2015) (Year: 2015).*

Wang, J.H., et al. "A System-Level Thermal Simulator with Automatic Meshing Techniques" IEEE 17th Intersociety Conf. on Thermal & Thermomechanical Phenomena in Electronic Systems (2018) (Year: 2018).*

Sultan, H., et al. "A Survey of Chip-level Thermal Simulators" ACM Computing Surveys, vol. 52, No. 2, article 42 (2019) (Year: 2019).*

\* cited by examiner

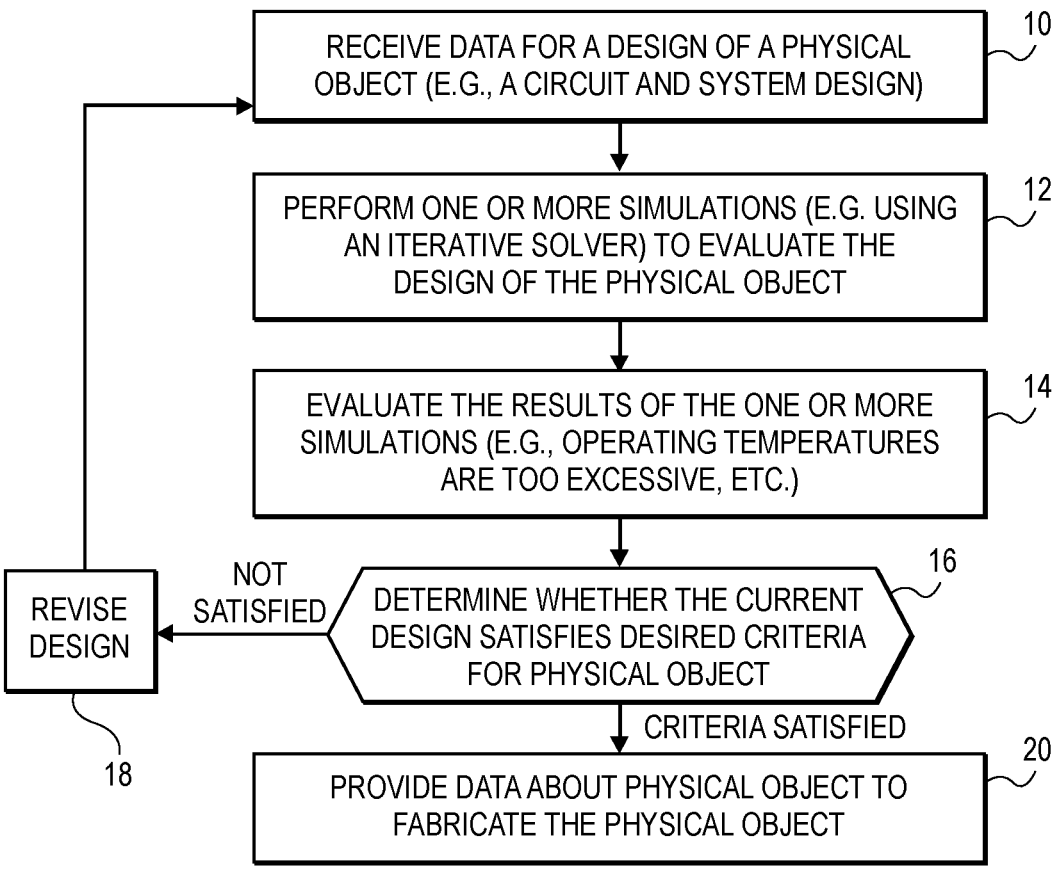

RECEIVE DATA FOR A DESIGN OF A PHYSICAL OBJECT (E.G., A CIRCUIT AND SYSTEM DESIGN) 10

PERFORM ONE OR MORE SIMULATIONS (E.G. USING AN ITERATIVE SOLVER) TO EVALUATE THE DESIGN OF THE PHYSICAL OBJECT 12

EVALUATE THE RESULTS OF THE ONE OR MORE SIMULATIONS (E.G., OPERATING TEMPERATURES ARE TOO EXCESSIVE, ETC.) 14

REVISE DESIGN 18

NOT SATISFIED

DETERMINE WHETHER THE CURRENT DESIGN SATISFIES DESIRED CRITERIA FOR PHYSICAL OBJECT 16

CRITERIA SATISFIED

PROVIDE DATA ABOUT PHYSICAL OBJECT TO FABRICATE THE PHYSICAL OBJECT 20

FIG. 1

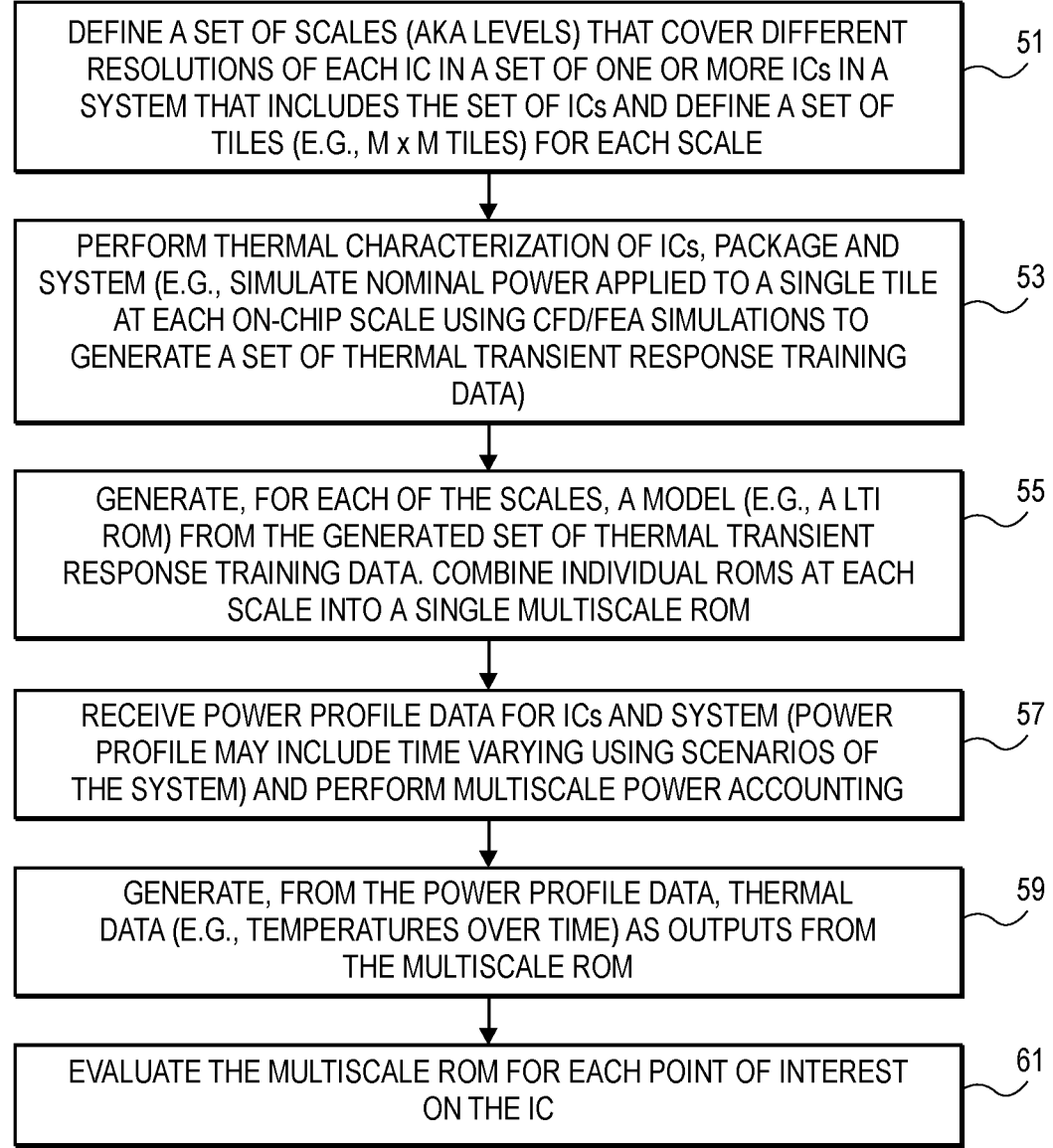

DEFINE A SET OF SCALES (AKA LEVELS) THAT COVER DIFFERENT RESOLUTIONS OF EACH IC IN A SET OF ONE OR MORE ICs IN A SYSTEM THAT INCLUDES THE SET OF ICs AND DEFINE A SET OF TILES (E.G., M x M TILES) FOR EACH SCALE — 51

PERFORM THERMAL CHARACTERIZATION OF ICs, PACKAGE AND SYSTEM (E.G., SIMULATE NOMINAL POWER APPLIED TO A SINGLE TILE AT EACH ON-CHIP SCALE USING CFD/FEA SIMULATIONS TO GENERATE A SET OF THERMAL TRANSIENT RESPONSE TRAINING DATA) — 53

GENERATE, FOR EACH OF THE SCALES, A MODEL (E.G., A LTI ROM) FROM THE GENERATED SET OF THERMAL TRANSIENT RESPONSE TRAINING DATA. COMBINE INDIVIDUAL ROMS AT EACH SCALE INTO A SINGLE MULTISCALE ROM — 55

RECEIVE POWER PROFILE DATA FOR ICs AND SYSTEM (POWER PROFILE MAY INCLUDE TIME VARYING USING SCENARIOS OF THE SYSTEM) AND PERFORM MULTISCALE POWER ACCOUNTING — 57

GENERATE, FROM THE POWER PROFILE DATA, THERMAL DATA (E.G., TEMPERATURES OVER TIME) AS OUTPUTS FROM THE MULTISCALE ROM — 59

EVALUATE THE MULTISCALE ROM FOR EACH POINT OF INTEREST ON THE IC — 61

FIG. 2A

On-Chip ROM (Levels 1 - N) Coverage Area
—101

—103

Level N 105

Level N-1 107

Level N-2 109

Level 1
(Extrapolated)
111

Chip $$T = T_{amb} + \sum_{i=0}^{N} \Delta T_i$$

Multiscale ROM Temperature Calculation for a tile

$T = T_{amb} + dT_0 + dT_1 + dT_2 \cdots + dT_N$

Temperature at a give point/tile on chip requires the evaluation of N+1 ROMs in total.

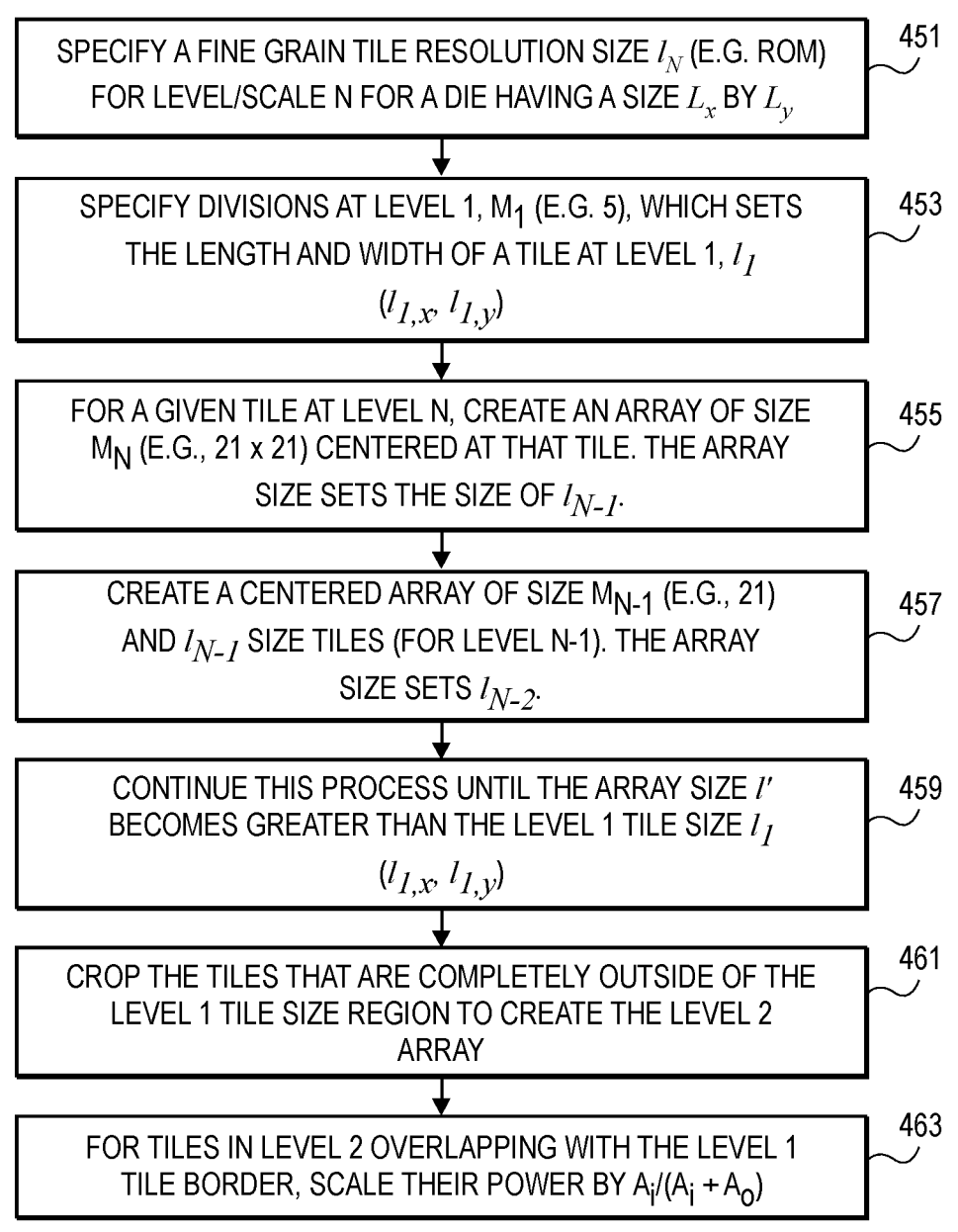

SPECIFY A FINE GRAIN TILE RESOLUTION SIZE $l_N$ (E.G. ROM) FOR LEVEL/SCALE N FOR A DIE HAVING A SIZE $L_x$ BY $L_y$ — 451

SPECIFY DIVISIONS AT LEVEL 1, $M_1$ (E.G. 5), WHICH SETS THE LENGTH AND WIDTH OF A TILE AT LEVEL 1, $l_1$ $$(l_{1,x}, l_{1,y})$$

— 453

FOR A GIVEN TILE AT LEVEL N, CREATE AN ARRAY OF SIZE $M_N$ (E.G., 21 x 21) CENTERED AT THAT TILE. THE ARRAY SIZE SETS THE SIZE OF $l_{N-1}$. — 455

CREATE A CENTERED ARRAY OF SIZE $M_{N-1}$ (E.G., 21) AND $l_{N-1}$ SIZE TILES (FOR LEVEL N-1). THE ARRAY SIZE SETS $l_{N-2}$. — 457

CONTINUE THIS PROCESS UNTIL THE ARRAY SIZE $l'$ BECOMES GREATER THAN THE LEVEL 1 TILE SIZE $l_1$ $$(l_{1,x}, l_{1,y})$$

— 459

CROP THE TILES THAT ARE COMPLETELY OUTSIDE OF THE LEVEL 1 TILE SIZE REGION TO CREATE THE LEVEL 2 ARRAY — 461

FOR TILES IN LEVEL 2 OVERLAPPING WITH THE LEVEL 1 TILE BORDER, SCALE THEIR POWER BY $A_i/(A_i + A_0)$ — 463

FIG. 6A

MULTISCALE THERMAL REDUCED ORDER MODEL FOR TRANSIENT IC ANALYSIS

This application claims the benefit of U.S. provisional patent application No. 63/253,363, filed Oct. 7, 2021 by Applicant Ansys, Inc. and entitled Multiscale Thermal Reduced Order Model for IC Analysis, and this provisional patent application is incorporated herein by reference.

BACKGROUND

This disclosure relates to the field of designing and developing circuits, such as integrated circuits (ICs) and more particularly to analyzing thermal characteristics of ICs and systems containing ICs.

After an IC or set of ICs have been designed and before they have been fabricated, it is desirable to simulate how they will operate in a system to ensure they can satisfy thermal criteria during use. It is common for consumer electronic devices, such as smart phones and laptop computers to get hot during operation. Designers of such systems seek to ensure that they do not become too hot. There is a demand for fast transient thermal simulations on-chip that can take real power profiles as inputs and apply control mechanisms to modulate power, and these simulations can test how hot a particular design becomes during typical usage scenarios.

To accurately capture chip thermal hot spots, detailed chip, package, and system (CPS) models are all necessary, and one is not independent from the other. A system-level thermal model, e.g., using computational fluid dynamics (CFD), can be on the order of 10 cm, while a chip-level thermal model may require resolution on the order of 10 μm or less to capture hot spots. Similarly, to capture relevant transient thermal behavior a system-level thermal model should resolve time steps typically on the order of $10^{-1}$-1s, while the chip-level thermal model may require resolution on the order of microseconds ($10^{-6}$ s). The order of magnitude difference in length and time scales, e.g., $10\bigcirc 5$ m and $10\bigcirc 6$ s, respectively, rule out the use of existing simulation technology, even with the use of state-of-the-art high-performance computing (HPC) approaches.

SUMMARY OF THE DESCRIPTION

In one embodiment, several reduced order models (ROMs), each at a different scale or level, are developed for a given chip package system (CPS), which can include one or more integrated circuits (ICs), for simulating thermal responses (e.g., heating in the ICs and the system) as a result of usage scenarios of the CPS (in which power is applied on the chip and in the system) over time. An IC, package and system can be thermally characterized to determine transient temperature response to a power source in each IC (also referred to as a chip); this characterization can use simulations of the power source to simulate temperature responses at points in the IC, package and system, and these responses provide a set of thermal training data. An algorithm, in one embodiment, generates a linear time-invariant (LTI) state-space thermal macromodel or ROM at each of the different scales or levels on-chip and in system, from the set of thermal step response training data, and combines them into a multiscale ROM, which can be distributed and solved on many CPUs for the evaluation of different points on the IC. When the multiscale ROM is used, a power accounting method can be used across the scales to conserve power. On IC heat transfer symmetry and inverse heat transfer properties can be used to reduce the amount of thermal characterization data and operations.

Chips may be coupled to other chips and heat sources/monitors at the system level using the 0 Level ROM. For stacked dies that are close vertically this method provides for thermal coupling at Levels 1-N to model hot spot effects on one chip impacting adjacent chips in the vertical stacking.

A method according to one embodiment can include the follow operations: generating a set of thermal transient response training data for each of a set of scales over a model of one or more integrated circuits (ICs) in a package in a system; generating, for each of the scales, a linear time-invariant (LTI) state-space reduced order model (ROM) from the generated set of thermal transient response training data for the scale, thereby producing a set of ROMs covering the set of scales; applying a simulated power as an input to each ROM in the set of ROMs to produce transient thermal data at each scale; and combining the transient thermal data at each scale to produce transient thermal data based on all of the ROMs in the set of ROMs. In one embodiment, the set of scales include a first scale having a first coverage of a first IC of the one or more ICs and a second scale having a second coverage of the first IC, and wherein the second scale has finer resolution than the first scale and covers less of the first IC than the first scale. In one embodiment, the set of scales includes a scale (referred to as level 0) having a third coverage which covers the system, and wherein the third coverage includes each of the one or more ICs, and wherein a first resolution of the first scale is smaller than a second resolution of the second scale (so the second scale has a finer resolution than the first scale). In one embodiment, the system includes a plurality of ICs that are thermally coupled through the level 0 scale. In one embodiment, the simulated power is a time varying power profile that is based on a time varying usage scenario of the system.

In one embodiment, the training data is generated using inversion and symmetry properties of tiles in the first scale, the second scale, and subsequent scales to reduce computations required to generate the training data. In one embodiment, the training data is generated from a set of computational fluid dynamics (CFD) simulations, with one CFD simulation for each scale in the set of scales.

In one embodiment, the simulated power is distributed across each of the scales and is conserved to avoid double counting of power across all of the scales. In one embodiment, each transient thermal data for at least a subset of the set of scales is computed independently using a parallel computing configuration and the combining adds the computed transient thermal data. For example, a first processing core in a processing system can compute the transient thermal data for a first scale using a first ROM and a second processing core in the processing system can compute, independently of the processing by the first processing core, the transient thermal data for a second scale using a second ROM. A parallel computing configuration can also be used for the independent evaluation of the multiscale ROM at various points or tiles on each IC. In particular, the multiscale ROM can be independently evaluated at each of the different points on an IC; for example, a first processor or processing core can evaluate the multiscale ROM at a first point and a second processor or processing core can evaluate the multiscale ROM at a second point so that a high resolution temperature map over the different points can be generated in parallel. Given enough computing capacity, hundreds or thousands of points on an IC can be evaluated in parallel at the same time.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 1 is a flowchart that shows a method of using one or more embodiments described herein to design a circuit and to evaluate the circuit, such as a system of one or more packaged ICs in the system.

FIG. 2A is a flowchart that shows a method according to one embodiment.

FIG. 6A is a flowchart that shows a method according to one embodiment for setting up the scales or levels prior to a characterization of a system.

DETAILED DESCRIPTION

Figure 2B:
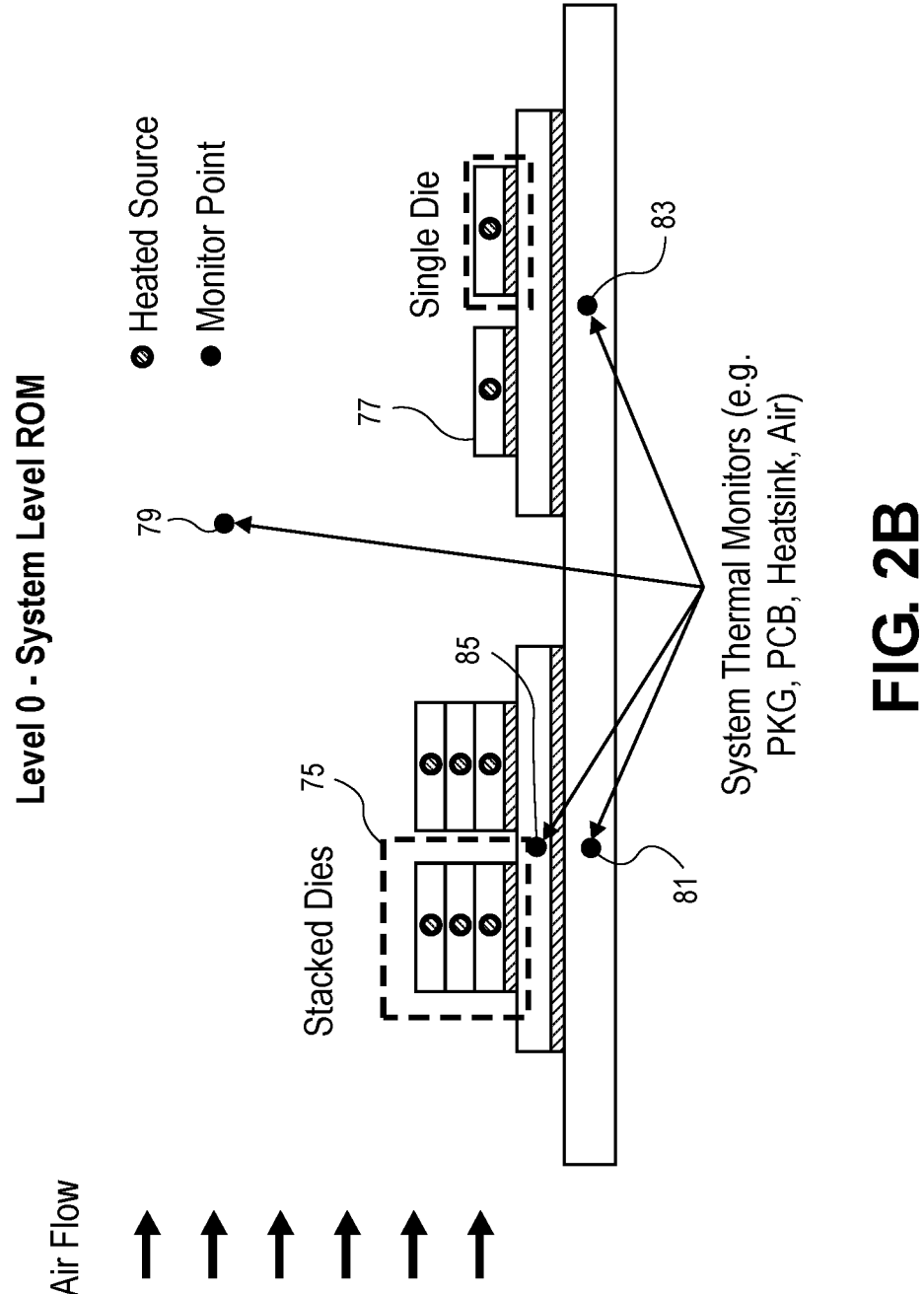
FIG. 2B shows an example of a system level ROM (designated as level or scale 0).

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can be used in simulations of electrical circuits (for example, an IC, 3DIC [three dimensional ICs], or set of ICs in a system) in order to determine whether a particular design of the IC (or 3DIC or set of ICs in the system) satisfies particular thermal requirements for the circuit or system containing the circuit. For example, there might be certain design requirements relating to a maximum temperature ("hot spot") at one or more points in a system and in each of the one or more ICs. The system may be used over a period of time (e.g., 2 minutes or 10 minutes) in various different ways that consume varying levels of power, resulting in varying temperatures over time on points on the system. FIG. 1 shows a method in which these design requirements can be tested relative to a particular design of an IC which is being simulated for a given system. In operation 10 of FIG. 1, a data processing system (e.g., a computer executing simulation software to provide a simulation system) can receive data about a design for a particular set of one or more ICs and associated IC packages or other system components such as a printed circuit board (PCB), heat sink, fans, etc. This data can be similar to the data inputted into Icepak from Ansys, Inc. of Canonsburg, Pennsylvania. The data can be created in CAD (computer aided design) software on a data processing system, and the IC design data can include cell library information, other timing information and information about the geometry of the IC, pins and nets in the IC and information about the materials in the conductors and dielectrics (e.g., silicon dioxide, etc.) and sizes of the conductors and dielectrics, etc. Then in operation 12, the data processing system can perform one or more simulations (such as simulations based on physical models of the one or more ICs and associated IC packages and PCB) to evaluate the design of the IC and system by determining, for example, transient thermal data (such as changes in temperature values over time in the one or more ICs and in the system) during the simulated operation of the system. These simulations can use the aspects and embodiments described herein. In operation 14, the designer can evaluate the results of one or more simulations to determine whether the design of the one or more ICs and the system satisfies certain desired criteria for the design. This determination is shown in operation 16. If the one or more criteria is satisfied, then the designer in operation 20 can provide data about the circuit and/or system to allow the fabrication or manufacture of the IC or system. For example, if the one or more criteria are satisfied, a CAD file can be produced that describes how to build the one or more ICs and the system. If the criteria are not satisfied as determined in operation 16, the designer can revise the design in operation 18 (for example, by changing sizes and/or quantity of the heat sinks and other cooling mechanisms and/or changing the design of circuits in one or more ICs, etc.) and repeat the process by performing additional further simulations to evaluate the redesigned circuit and system. This can be repeated until the desired criteria are achieved for the circuit and system.

In one embodiment, a method to perform transient thermal simulations on ICs (also known as "chips") in multi-chip systems and 3 dimensional IC packages can accomplish one or more of the following features: (1) capture on-chip hot spots with fine-grain resolution (2) account for system-level thermal effects with a lower resolution than the fine-grain resolution (3) rely on minimal chip, package, system (CPS) thermal characterization (4) provide extremely fast solutions (e.g. in seconds), and (5) provide excellent accuracy compared to full fidelity models based on, for example, computational fluid dynamics (CFD), e.g. within 5% error. The method described herein can use a new multiscale, distributable, system modeling approach with black box Reduced Order Model (ROM) that overcomes challenges with traditional CPS thermal modeling to meet the stated goals. This approach can result in a fully transient representation of on-chip thermal hot spots with high accuracy and high speed, while accounting for system thermal effects. In one embodiment, a training data generation method can leverage inverse heat transfer characteristics and symmetry on the chip. For improved thermal accuracy, rather than a silicon block model, a 3-layer chip model can be employed. With millions of discrete heat sources on a chip, e.g., 10 um sources on a 16 mm chip, an extremely large multi-input, single-output (MISO) thermal characterization problem for ROM building is converted to a single-input, multi-output (SIMO) one. Such an inversion leads to many orders of magnitude (e.g. $10^6$) reduction in thermal characterization time and number of simulations necessary. On-chip near-field, far-field, and system thermal response training data can be gathered at the different length scales. An approach to extrapolate the on-chip far field training data is described, which ensures complete chip coverage for off center evaluation points in the present tile-by-tile sweeping (TbTS) procedure. Both on-chip and system thermal characterization data can be generated directly in the full CFD system environment, i.e. in-situ, fully and accurately accounting for system thermal capacitance (or thermal inertia), nonuniform boundary conditions, e.g., from fluid flow effects, conjugate heat transfer, and other relevant system thermal effects such as the on-chip behavior. An algorithm, described further below, generates a linear time-invariant (LTI) state-space thermal macromodel at the different scales on-chip and in system, from a set of thermal step response training data, and combines them into a multiscale CPS ROM, which can be distributed and solved on many CPUs. Leveraging a tile-by-tile sweeping (TbTS) methodology leads to a highly distributable and scalable approach that can solve a high-resolution full chip model extremely quickly using distributed high performance computing techniques. This approach enables flexibility for full chip modeling, or partial chip modeling, e.g., at discrete thermal sensors.

Figure 2C:
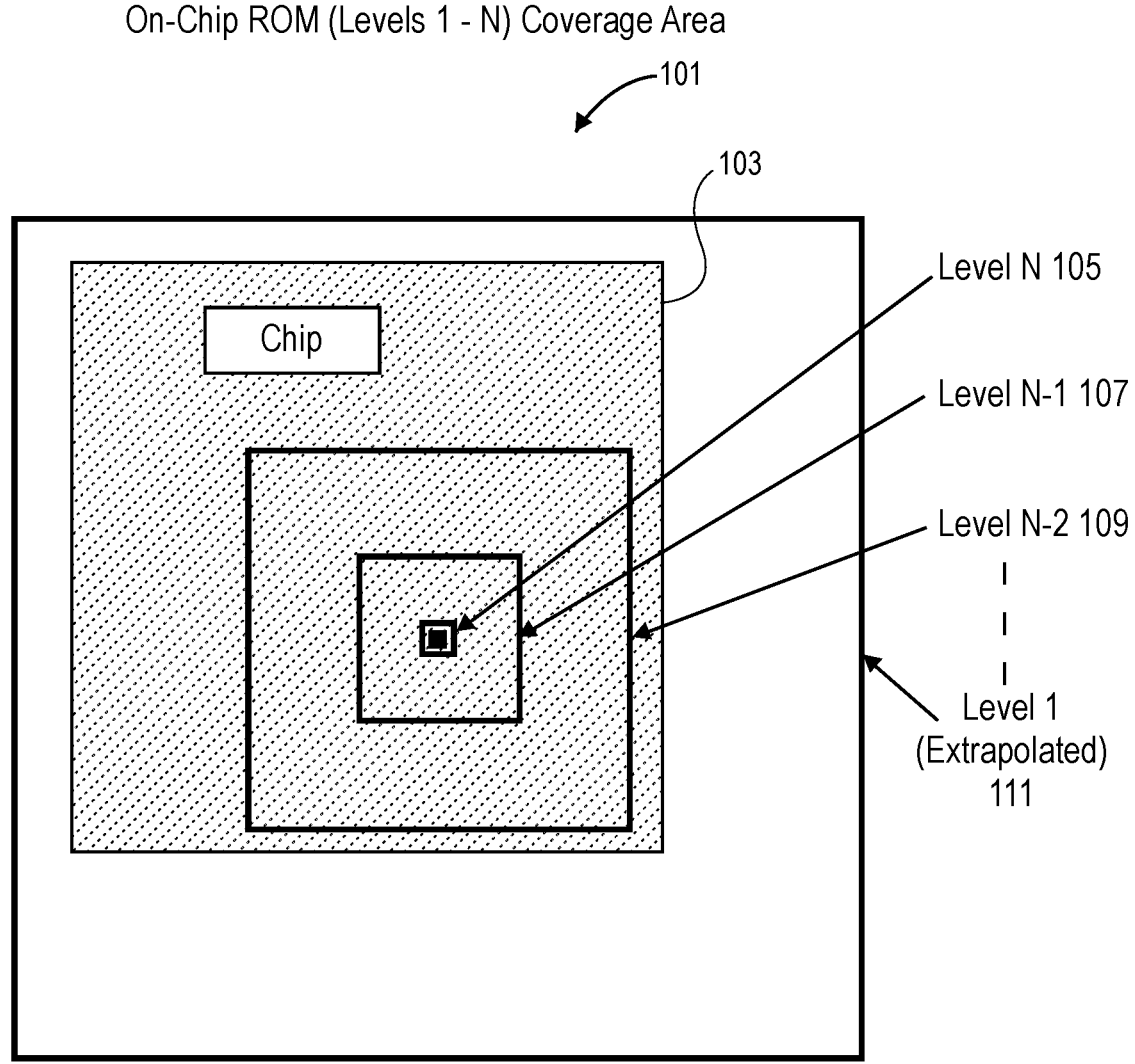
FIG. 2C shows an example of a set of scales or levels for one IC according to one embodiment.

An example of a method according to one embodiment is shown in FIG. 2A. In operation 51 in FIG. 2A, a set of scales (also known as levels) are defined and a set of tiles are defined for each scale. The set of scales cover different resolutions of each IC in the system; in one embodiment, the Nth scale covers the highest resolution (finest resolution) of each IC and scale 1 covers the entire IC with a coarse resolution (e.g. a 5×5 grid of tiles over the entire IC). An example of how these scales and set of tiles can be defined is provided below (in conjunction with FIGS. 6A-6I). FIG. 2C shows an example of how N levels or scales 101 can be defined for a single IC. Level N 105 has the smallest coverage of the IC 103 but has the highest resolution (relative to the other scales). Level N−1 107 has more coverage of the IC 103 but less resolution than level N 105, and level N−2 109 has more coverage of the IC 103 but less resolution than level N−1 107. Level 1 (111) covers the IC entirely, and extends beyond IC 103 by the extrapolation described herein. The set of scales or levels also include a level 0 ("system level") that includes the entire system, which may include a set of ICs and associated packages (containing the ICs) and PCBs or other system level thermal effects. FIG. 2B shows an example of a system level model with stacked dies 75 and single dies (e.g., single die 77) in one or more packages (not shown) and a PCB. Each of the dies includes a simulated heat source during thermal characterization (e.g., an excited tile that is excited by an application of simulated power according to a power profile). The simulations used in the thermal characterization can use a set of monitor points (e.g., monitor points 81, 83, 85 and 79) that are selected to provide outputs of temperature values from the results of one or more simulations (monitor points are included for heat sources). Another example of stacked dies (3DIC) is shown in FIG. 2F, which shows how heat sources are distributed over the stack of dies 153 in the system 151. Each die is separately characterized as described further below; thus, there is a top die characterization 155, a middle die characterization 157, and a bottom die characterization 159 for on-chip thermal behavior.

A hot spot on a chip in a stack of chips in a 3DIC, as in FIG. 2F, can lead to hot spots on other chips in the stacked arrangement due to their proximity in the vertical direction. This is accounted for by coupling the chips together not just at the system level (Level 0) as would generally be done in this approach, but at the on-chip levels (Levels 1-N) as well. Coupling chips thermally is performed by not just measuring thermal response on the chip containing the heated tile, but by also measuring (through the CFD simulations) the thermal response on the other stacked chips in the stacked 3DIC arrangement due to this heating. For example, for Level N characterization of the top die in FIG. 2F, an M×M array of monitor points measure the transient thermal response on the top die due to the heating. Similar M×M arrays on the middle and lower dies measure transient thermal response due to the heating on the top die. Such a characterization captures hot spots effecting adjacent chips.

A thermal characterization, in operation 53 in FIG. 2A, of a particular set of one or more ICs and associated packaging and system can be performed based on data about the particular set of one or more ICs and the packaging of the one or more ICs and the system containing the one or more ICs. This data can include the conventional data used as inputs in thermal CFD simulations in Icepak from Ansys, Inc. For example, this data can include cell library information, information about the geometry and layout of each of the one or more ICs, pins and nets in the IC, thermal information about the IC (e.g., thermal conductivity values) and information about the materials in the conductors and dielectrics (e.g., silicon dioxide, etc.) and sizes of the conductors and dielectrics, and other materials in the structure of the IC, etc.; this data can include PCB layout geometry, 3D CAD system geometry, and system heat sources and sinks for the system level description. The characterization can use a conventional semiconductor model (a silicon block die model) for the structure of the IC or a simplified model such as a 3 layer model shown in FIG. 2E. In the model of the IC shown in FIG. 2E, the silicon substrate 141 is the largest layer, followed, in size, by a layer 147 representing all of the numerous interconnection layers in a typical IC. The numerous insulation and dielectric layers are represented by layer 143. Finally, the device layer 145 (containing the transistors, diodes and other electrical components) is part of the structure but may not be considered as significantly contributing to the thermal properties (e.g., thermal conductivity) of the structure. The 3 layer model can capture additional thermal resistance, better capturing chip hot spots when fine grain power maps are modeled. In one embodiment of this 3 layer model, the interconnection layer 147 can be 6 microns in thickness, the insulation layer 143 can be 50 nanometers in thickness, and the silicon substrate layer 141 can be 100 microns in thickness. Within each level/scale, the thermal characterization process in operation 53 can use an array to define tiles that are evaluated during the simulations of the thermal characterization process.

Figure 2D:
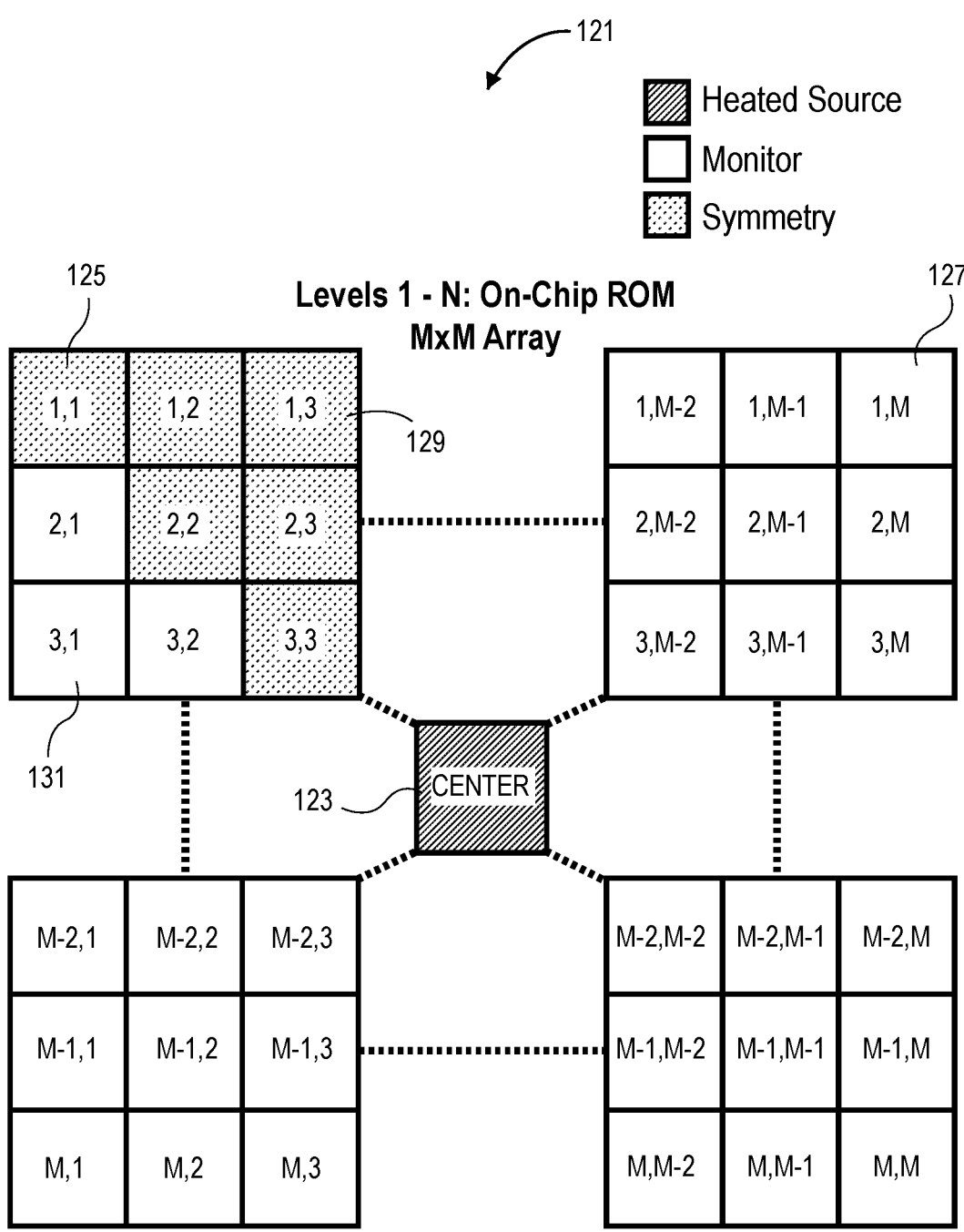
FIG. 2D shows an example of an array that may be used for characterization at each on IC scale.
Figure 2E:
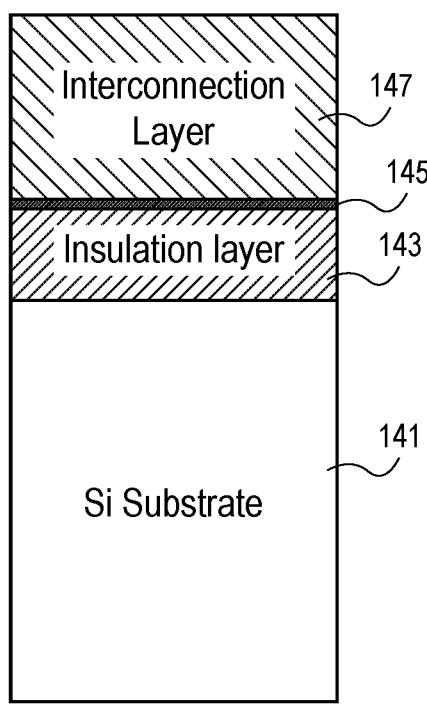
FIG. 2E shows an example of a simplified model of a structure of an IC that may be used during the thermal characterization that generates thermal training data according to one embodiment.
Figure 2F:
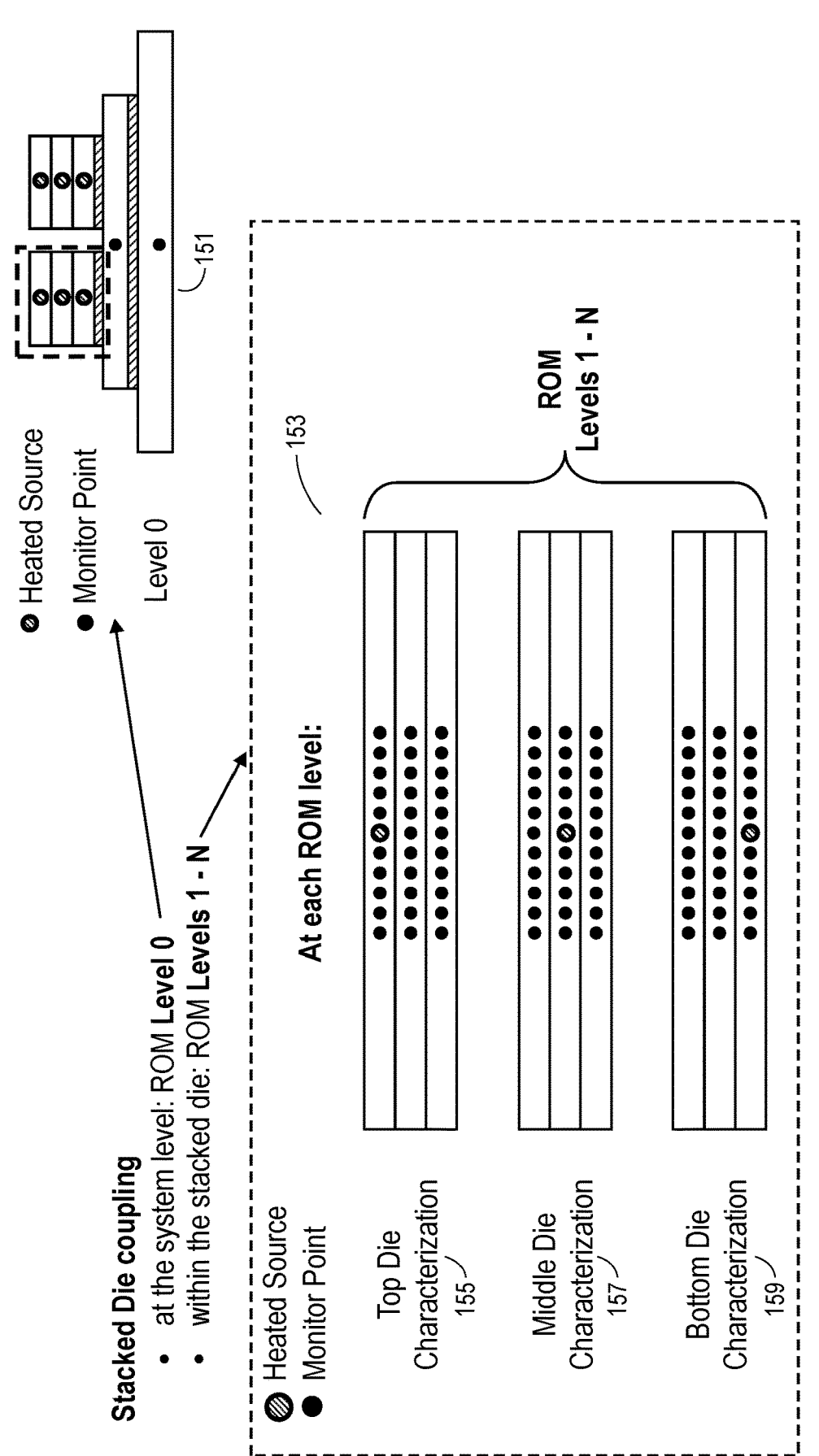
FIG. 2F shows an example of thermal characterization (to generate thermal training data) for a set of stacked dies in a system according to one embodiment.
Figure 3A:
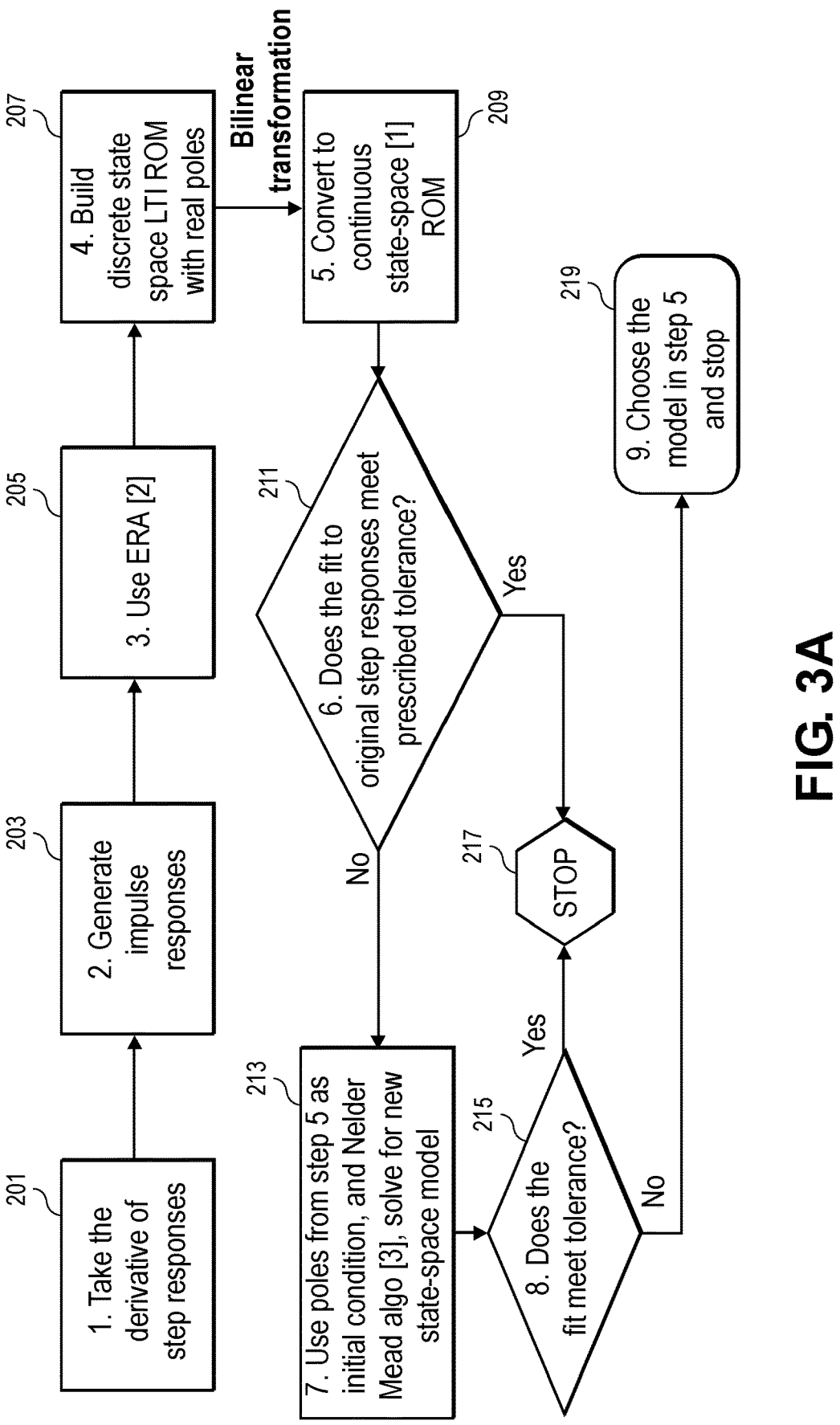
FIG. 3A is a flowchart that shows a method, according to one embodiment, for generating a LTI ROM for each scale or level.

FIG. 2D shows an example of such an array that can be used in operation 53. The array 121 includes M×M tiles, including a center tile 123, an upper right corner tile 127, an upper left corner tile 125, and tiles 129 and 131. Each level or scale can use such an array, and the array can vary depending on the scale or level. For example, one scale can use an array in which M=21, and another scale can use array with M having a different value; further, the size of the tiles can vary between the scales. Each level or scale is separately thermally characterized by thermal CFD simulations using such arrays. During thermal characterization, the center tile is treated as the local heat source (by applying a simulated nominal power to the center tile to cause it to heat up), and the simulation system (e.g., a thermal CFD simulation such as an Icepak simulation) determines the temperature response (based on the simulated power) at all or a subset of the tiles in the M×M array; applying power at the center source and measuring temperature at other tiles takes advantage of an inverse heat transfer characteristic for reduced training requirement; the subset used for measuring temperature is about one-eighth of the entire array due to symmetry properties. The subset in FIG. 2D include tiles 1,1; 1,2; 1,3; 2,2; 2,3; and 3,3. This subset is sufficient to simulate the entire array because of symmetry. The inversion property is based on the assumption that a temperature response on tile A (e.g., tile 125) due to heating on tile B (tile 123) is equivalent to a temperature response on tile B (e.g., tile 123) due to heating on tile A (tile 125). The symmetry property relies on the symmetry of tiles in the array. For example, the temperature response of tile 131 due to heating on tile 123 is the same (or assumed to be the same) as the temperature response of tile 123 due to heating on tile 131; the temperature response of tile 1,M due to heating of tile 123 is the same as the temperature response of tile 123 due to heating of tile 1,M. The use of these properties dramatically reduces the computation requirements and characterization data during the thermal characterization process in operation 53. Heat loads are applied to other objects in the system as necessary to characterize the system. The time varying chip temperature response (e.g. at chip center point or its average temperature) is computed in the simulation at each scale or level, as well as the temperature response at other sources and monitors in the system (e.g. PKG, PCB, heatsink, elsewhere). Each heat source and heat monitor will be thermally coupled in the System-Level ROM (level 0). The separate simulation at each scale or level produces a set of thermal transient response training data (also referred to as step responses) which will be used to generate a ROM for the scale or level. This generation of a ROM for each level is performed in operation 55 in FIG. 2A. Once a ROM for each level is generated, all of the ROMs for the levels can be combined into a single multiscale ROM at the end of operation 55. FIG. 3A shows an example of a method for generating such ROMs.

The method shown in FIG. 3A is performed for each scale to create a ROM for each scale. In one embodiment, each ROM can be a state-space linear time invariant thermal reduced order model, which can also be referred to as a thermal macromodel. A set of thermal step response training data, where one input is activated at a time, with a time-constant thermal boundary condition is generated and provided from a system level CFD tool (e.g., Icepak from Ansys, Inc.). A time domain vector fitting algorithm can be used to generate a ROM at scale (level) 0 in one embodiment; see, for example, Stefano Grivet-Talocia, "The Time-Domain Vector Fitting Algorithm for Linear Macromodeling," AEU-International Journal of Electronics and Communications, Volume 58, issue 4, 2004, pages 293-295. The ROM in one embodiment can have one or more of the following properties: the poles or the eigenvalues of the system matrix is guaranteed stable; the poles are negative real; the direct coupling "D" matrix is zero which is expected from a thermal model; the state-space representation can be used to generate a Foster/Cauer network from a LTI state-space model to build a compact thermal model if desired.

The method shown in FIG. 3A can begin in operation 201 in which a data processing system computes the derivatives of the step responses in the thermal training data for a scale at a given input (heat) source. This computation of the derivatives can provide an approximation of the impulse responses and can be done either numerically or analytically (for example, a spline/PCHIP interpolation to the step response can be formulated and then the derivative can be found analytically). Operation 203 generates the impulse responses as a result of this computation of the derivatives of the step responses. In one embodiment, the impulse response data can be generated based on the following. Let the step response $$s(t) \cong \sum_{k=1}^{K} \sum_{l=0}^{3} c_{kl}(t - t_k)^l 1_{l_k}(t),$$

where $1_{I_k}(t)$ is the indicator/characteristic function $$1_{I_k}(t) = \begin{cases} 1, & \text{if } t \in I_k \\ 0, & \text{otherwise} \end{cases} \quad I_k = \{t : t_k \le t < t_{k+1}\}$$

$t_k$ are the original time samples, be represented by a cubic Spline/PCHIP interpolation function. The spline $c_{kl}$ coefficients can be found by any standard method using the step response training data samples.

Since we already assumed there is no direct coupling term then the derivative of the step response will provide the impulse response. Therefore, the impulse response is $$h(t) = \frac{ds(t)}{dt} \cong \sum_{k=1}^{K} \sum_{l=1}^{3} c_{kl} l(t - t_k)^{l-1} 1_{I_k}(t).$$

After the impulse response data is generated in operation 203, an Eigensystem Realization algorithm (ERA) can be used, in operation 205, to generate a discrete (stable) state-space representation $[A_d, B_d, C_d]$ for the impulse response at a given desired order or choice of truncation for the corresponding singular values of the Hankel matrix. The method shown in FIG. 3A can use numerical techniques that are known in the art, including for example the Eigensystem Realization algorithm and the Nelder-Mead method (see, for example, https://en.wikipedia.org/wiki/Eigensystem realization algorithm; and https://en.wikipedia.org/wiki/Nelder-Mead method). Using the ERA, a discrete state-space LTI ROM with real poles is provided in operation 207. This discrete state-space LTI ROM model is then converted in operation 209 into a corresponding equivalent continuous state-space LTI representation (e.g., $[A_c, B_c, C_c]$) using, for example, bilinear transformation. The output from operation 209 is used to find the pole estimates from the eigenvalues of $A_c$. The found poles are mapped and projected to the real axis; this can be done by, for example, by taking every complex conjugate pair pole and projecting a pair of real poles from them by looking at the crossing points to the real axis of a small (ellipsoid) ball passing through the complex pair poles (see FIG. 3B). Then operation 211 checks whether the original step responses fit to the continuous state-space LTI representation from operation 209; if the fit should be improved, then the poles from operation 209 are used as an initial condition for the Nelder-Mead algorithm in operation 213 to see if the fit can be improved and the results from operation 213 are checked in operation 215. If the results are adequate, then generation of the ROM is completed (operation 217), otherwise in operation 219 the system reverts to using the model from operation 209. Fitting of the model from operation 209 to the original step response data (from operation 201) can proceed as follows. Given the step response training data $Y_s$, for every input, and the continuous (stable) state-space model from operation 209, the data processing system will find the negative real poles which are the eigenvalues of the system matrix $A_c$ projected to negative real line, as initial condition to a global optimization problem cast in this way $$\min_{\tilde{A}_c, \tilde{B}_c, \tilde{C}_c} \|Y_s - Y_m\|$$

Where $Y_m = \tilde{C}_c X$ and X can be found by solving the following Ordinary Differential Equation (ODE):

$$\frac{dX}{dt} = \tilde{A}_c X + \tilde{B}_c u \text{ with } X_0 = X(0) = 0 \quad (1)$$

To solve (1) we use the initial guess for $\tilde{A}_c$, from operation 209, let $\tilde{B}_c$ be a vector of all ones same size as the state-space order. We use $l_2$ or Frobenius norm for $\|\cdot\|$.

Therefore,

1. Use the initial guess for the poles from operation 209
   A vector of negative real values which will go into the diagonal of $\tilde{A}_c$
   The input vector $\tilde{B}_c$ is all ones, hence a canonical or Schur block form of state-space representation is used where the residue terms are entirely represented by the $\tilde{C}_c$
2. Solve (1) for X where u is the step function
   Alternatively, instead of solving (1), closed form representation of step response from state-space representation can be used.
3. Solve the (weighted) least square problem $$\min_{\tilde{C}_c} \|Y_s - Y_m\| \text{ for } \tilde{C}_c$$

4. Make another guess for the poles and go back to 2 until a desired target fitting error or a maximum number of iterations are achieved in which case stop.

The Nelder-Mead algorithm can be used to accomplish this. There is no guarantee that the Nelder-Mead algorithm can always improve the fit; if no improvement is achieved (as checked by operation 215), then there is a fall back to the model from operation 209 (as shown in operation 219).

While the method shown in FIG. 2A generates a set of ROMs (for a given CPS) based on a set of data that describes the one or more ICs, associated packaging and system, an alternative embodiment can use a library of previously generated ROMs for a range of CPS design parameters, and a new design can be matched to the closest fitting ROMs in the library based on a comparison of the new design and the designs used to create the ROMs in the library.

Once the set of ROMs have been generated (e.g., the set of ROMs from the output of operation 55 in FIG. 2A), the ROMs can be used in operations 57, 59, and 59 in FIG. 2A to provide transient thermal data about the design that was used to create the set of ROMs (through the thermal characterization of the design in operation 53 in FIG. 2A). In operation 57, a power profile data for the design is received; the power profile data can include a high (e.g. 10 µm) resolution powermap for the IC, high resolution power maps for other ICs in the 3DIC, as well as power from other system sources, to be used as inputs to the set of generated ROMs. For example, the power profile data can be a set of time varying power values to simulate the usage of the system over time. If the system is a smart phone, the set of time varying power values could be based on a sequence of usage scenarios of the system (e.g., web browsing, then photography, then video recording, then texting, then navigation, etc.). Different sets of time varying power values can be applied to the set of generated ROMs within the multiscale ROM to determine how hot various parts or points on the IC in the system become during the simulated usage scenarios. A power profile data is applied as inputs to the set of generated ROMs within the multiscale ROM in operation 59, and the set of generated ROMs generate a set of thermal data (one set of thermal data from each ROM in the set of generated ROMs of the multiscale ROM). These individual solutions from each ROM are combined in operation 61 to provide the final thermal data, which can be a high resolution temperature map on IC, a set of high resolution temperatures at specified points on IC, as well as a set of temperatures over time at a set of points in the system (e. g., points on one or more ICs, points on associated packages, and points on PCBs). Operations 57, 59 and 61 can use the approaches shown in FIGS. 4A, 4B, 4C, and 4D to generate the final thermal data.

Figures 3B, 4A:
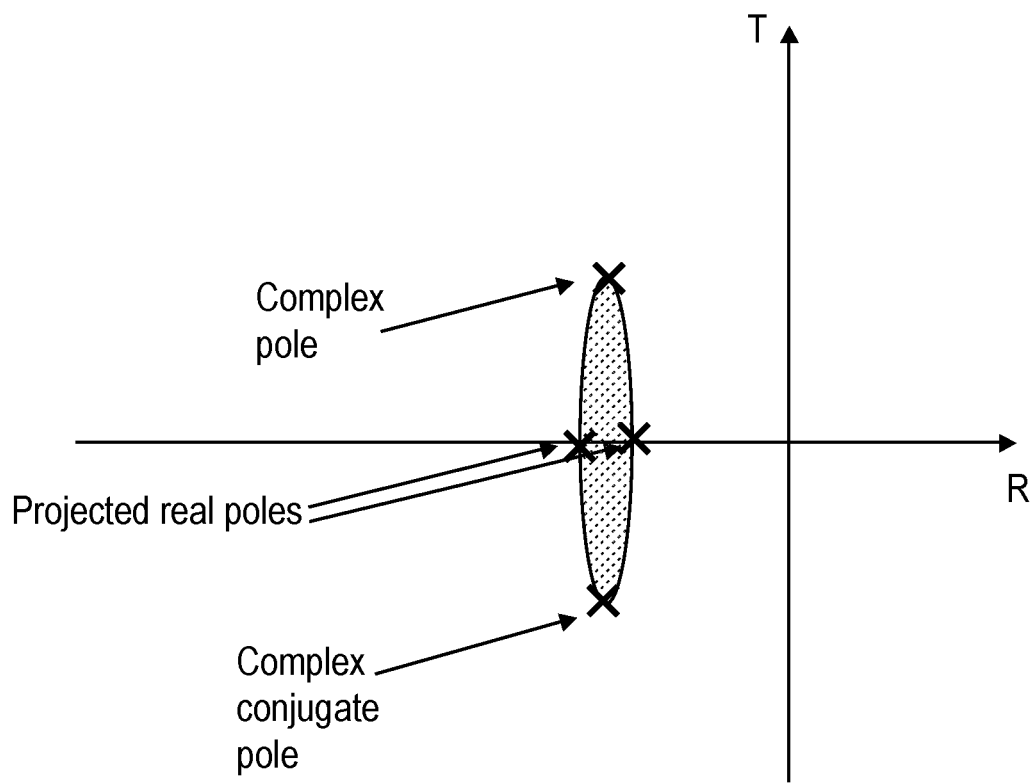
FIG. 3B shows an example of a method to project complex conjugate pairs to a real axis during the generation of a LTI ROM according to one embodiment.
FIG. 4A shows how, for a given tile on a given IC, the temperature is evaluated by combining the thermal data from each ROM's output at each scale or level.

As shown in FIG. 4A, each ROM is evaluated (e.g., computed) based on the inputs from operation 57 (e.g., inputs such as time dependent power profile data). Tile temperatures on different tiles on an IC are evaluated independently from one another, leading to a highly distributable computation process; each tile represents a specific "sensor" location. For a given tile on an IC in the system, the temperature T is evaluated as shown in FIG. 4A by summing the results of the change of temperature from each of the ROMs across the N+1 levels or scales and adding this sum to $T_{amb}$, where $T_{amb}$ is the ambient temperature and $\Delta T_i$ is the temperature change evaluated at ROM level i. This summing process can use the power distribution and accounting approaches described below (e.g., see FIGS. 4B, 4C, and 4D) so that power is distributed across the scales or levels and conserved so that the power applied over all of the scales does not exceed the total power applied to the system (which can include one or more ICs).

Figure 4B:
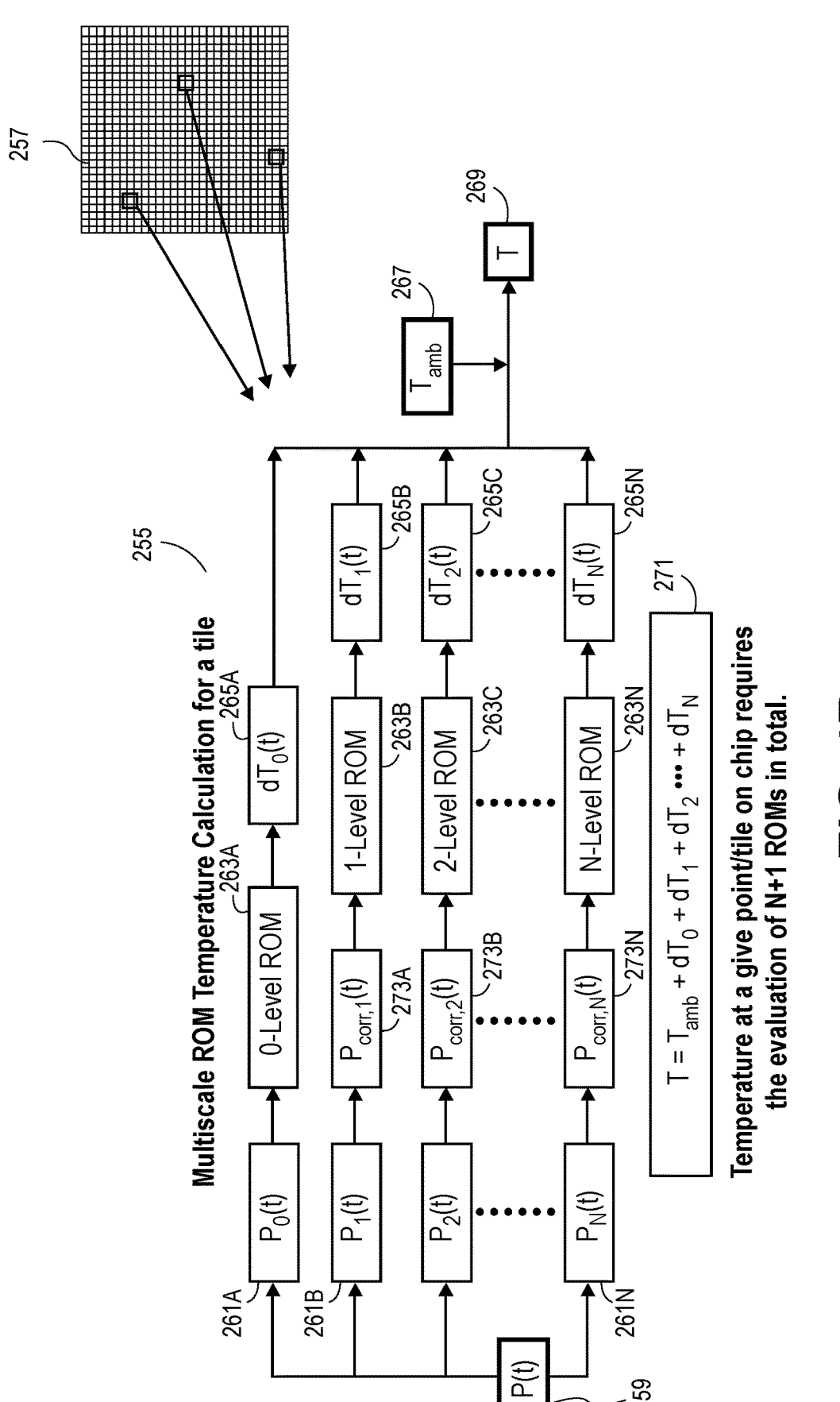
FIG. 4B shows an example of how the combined set of ROMs that cover a set of scales or levels can be used to receive a time dependent power profile of the system and provide an output indicating a time dependent temperature based on the input.

FIG. 4B shows further details about how operations 57, 59 and 61 receive the on chip complete power profile data 259 and distribute or allocate the power from the power profile data, as inputs, to individual ROMs at each scale or level to compute temperatures, at a tile or point, based on the output from each individual ROM and then combine the outputs from the ROM into a final temperature value 269 for the tile or point. The set of calculations 255 shown in FIG. 4B are performed separately for each tile in a set of tiles 257 that may be selected by a circuit designer. The set of calculations provide a final temperature value at a tile as a result of power being applied over the entire IC and the system thermal environment. The power profile data 259 can be a set of time varying (time dependent) power values for all tiles on the IC, and the power values can be distributed across the N+1 ROMs. The distribution of power values across the ROMs is shown by the distributed power values 261A, 261B, . . . and 261N. The distributed power value 261A represents the power value applied as an input to the system level ROM 263A, the distributed power value 261B represents the power value applied (after correction described below) as an input to the level 1 ROM (ROM 263B), and the distributed power value 261N represents the power value applied (after correction described below) as an input to the level N ROM (ROM 263N). The corrected power values (e.g., corrected power values 273A, 273B, . . . and 273N) conserve power, through a power accounting described below, across the N+1 levels of generated ROMs (ROMs 263A, 263B, 263C, 263N) to ensure that power is conserved so that the overall power used in the system does not exceed the total input power derived from the power profile data 259. Further information about the accounting that is used to conserve power is provided below in conjunction with FIGS. 4C and 4D. Each of the generated N+1 ROMs (ROMs 263A, 263B, 263C, . . . 263N) provide a time varying (time dependent) change in temperature value (265A, 265B, 265C, . . . and 265N). These time dependent changes in temperature values are summed (271) with the ambient temperature 267 to produce a set of time dependent final temperature values (269) at the given tile.

Figure 4C:
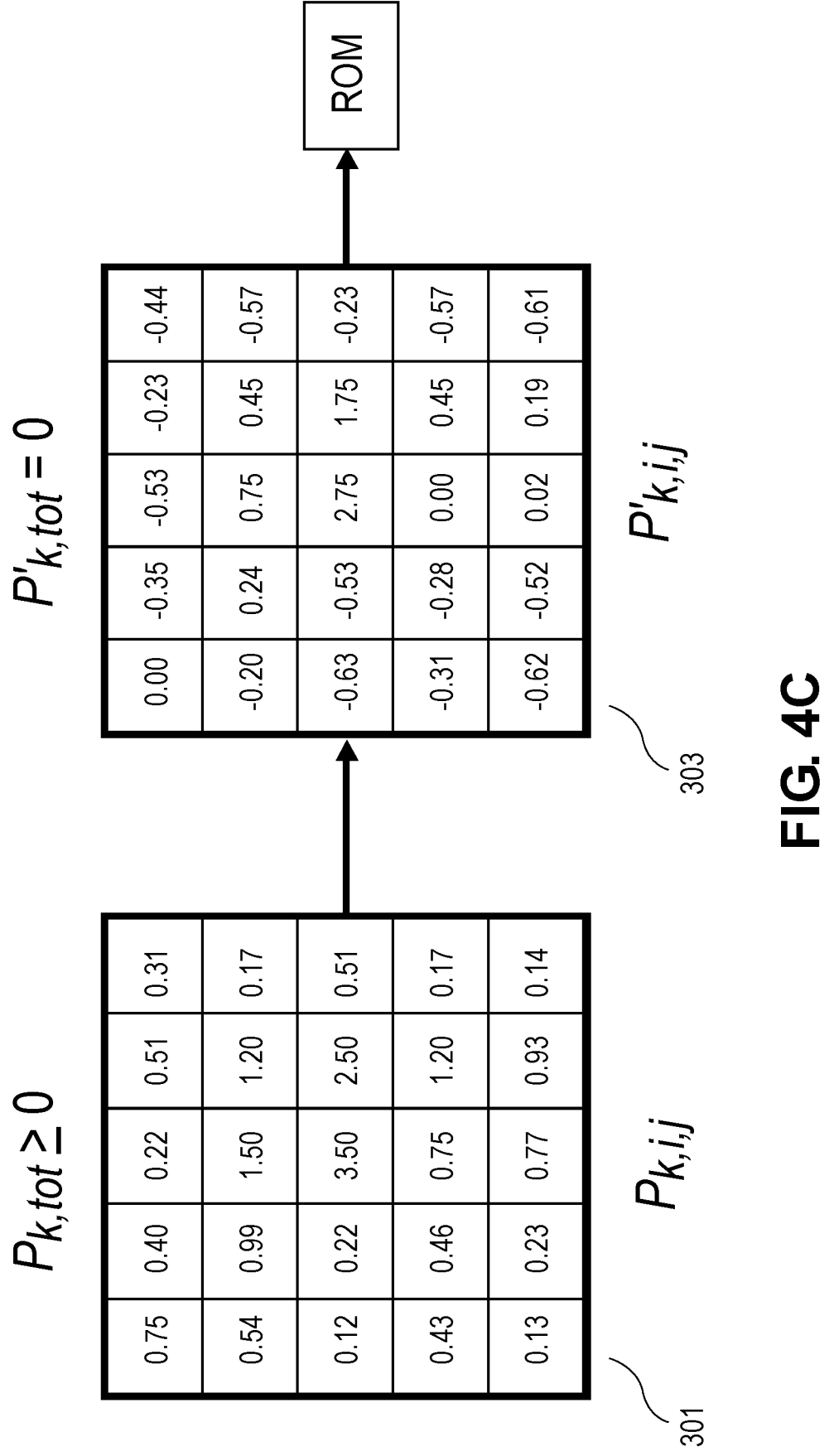
FIG. 4C shows an example of how power is distributed through the scales or levels and conserved across the scales or levels (to ensure that the power across the scales is not counted twice and does not exceed the total power applied to the system) for on-chip levels 1-N.
Figure 4D:
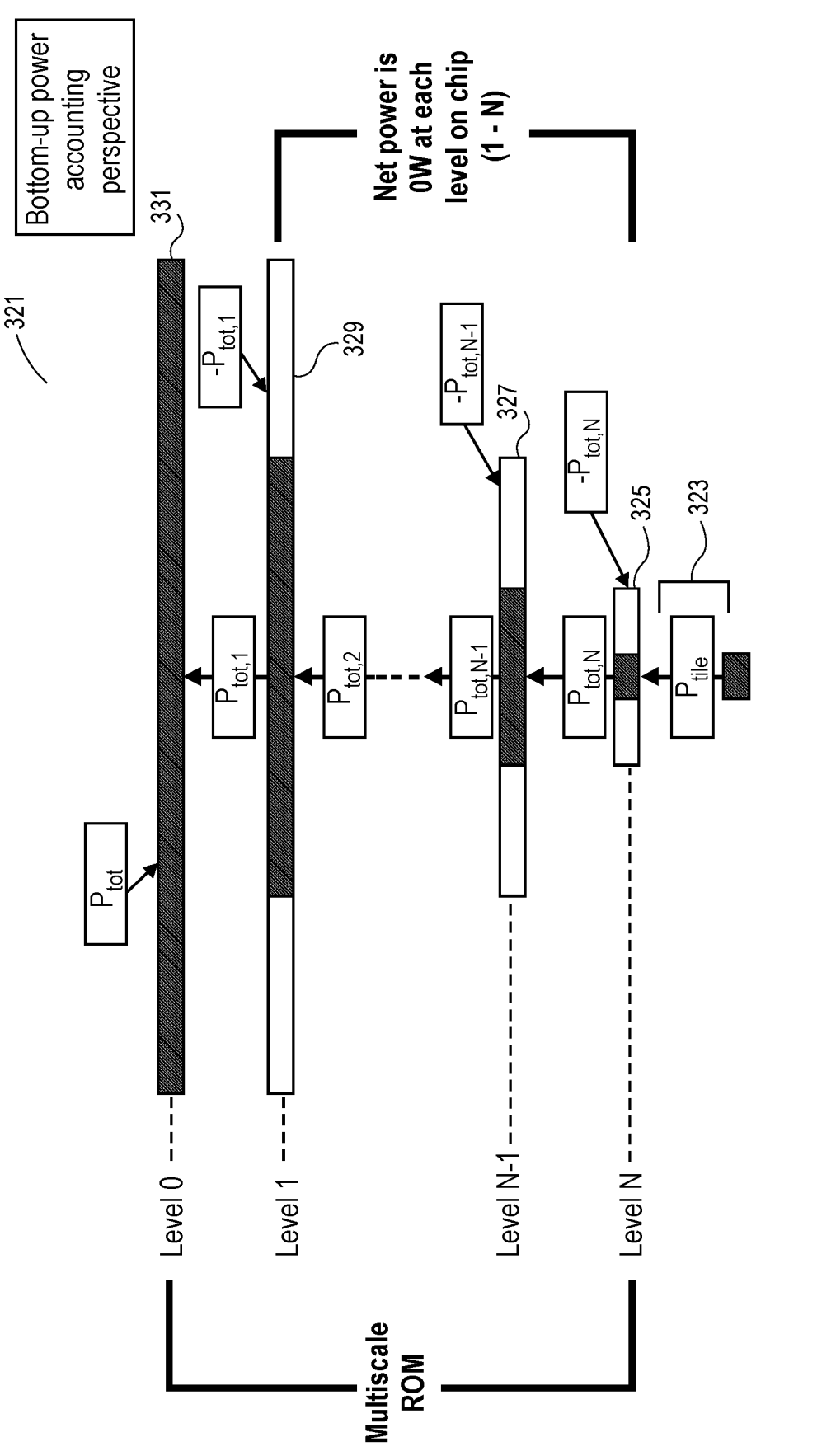
FIG. 4D shows an example of the power accounting, from a bottom up perspective, to conserve power used by the system.

FIG. 4C shows an example of a power accounting method according to one embodiment, and FIG. 4D shows a bottom-up power accounting perspective of this method. The total chip power, $P_{tot}$, is distributed across each level k of the multiscale ROM and conserved. For each on-chip ROM, at Levels (1-N), the total power in the ROM domain (covered by its M×M array of sources) is $P_{k,tot}$ for k∈1, N. At each level, $P_{k,tot}$, $(P_{k,tot}/M^2)$ is uniformly subtracted from each source's actual power $P_{k,i,j}$ (301 in FIG. 4C) to give a corrected power, $P'_{k,i,j}$, (303 in FIG. 4C) which is then input to the ROM. It is this corrected power, show in FIG. 4B, that is used in the ROM (e.g., corrected power value 273A is the input for ROM 263B). The level's total power $P_{k,tot}$ is then passed to the next ROM level up (i.e. k−1) in the appropriate (i.e. center) source term in the array. FIG. 4D illustrates this from a bottom-up power accounting perspective 321. This approach leads to 0 net power for each on-chip ROM, at Levels 1-N (e.g., levels 323, 325, 327, and 329 in FIG. 4D), conserving total chip and system power. For the system-level ROM, Level 0 (331 in FIG. 4D), on the other hand, the source includes the chip's actual total power (no correction is applied).

Figure 5:
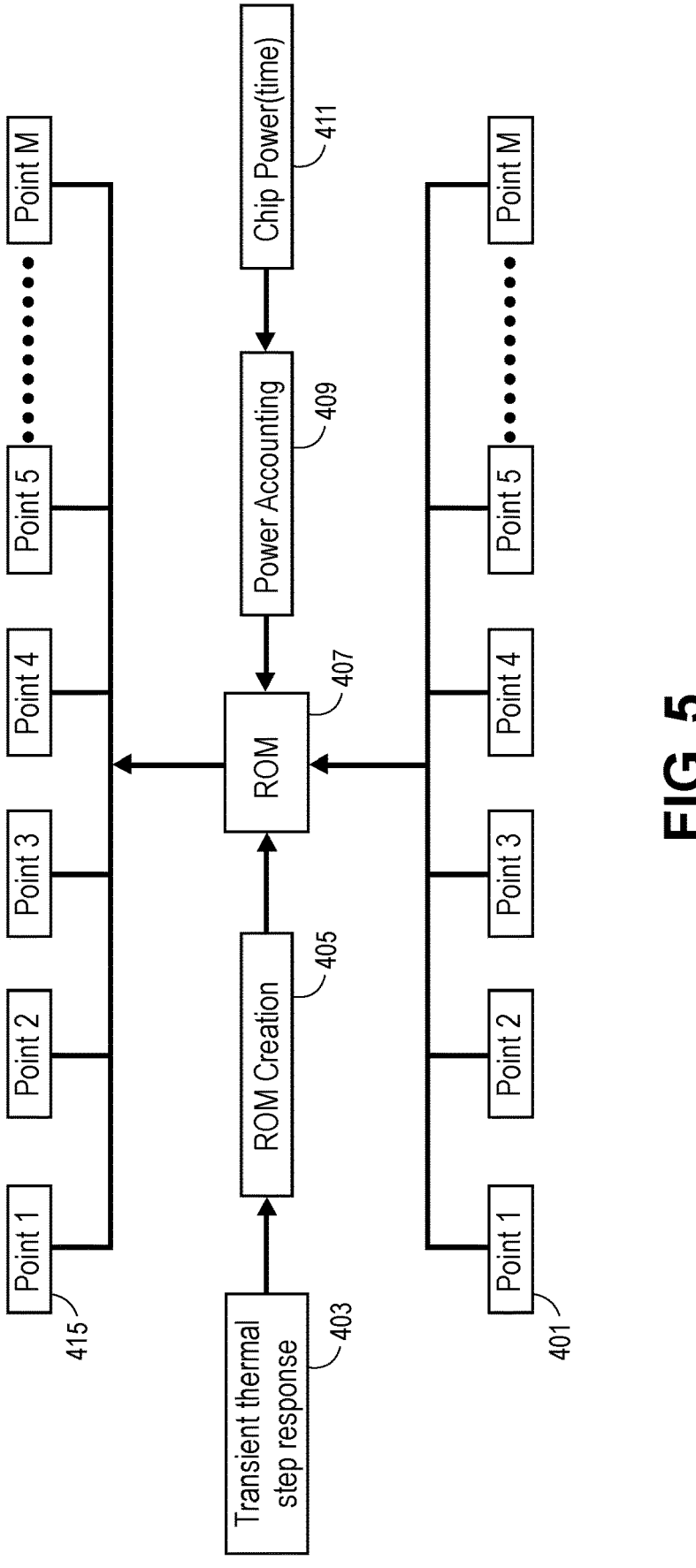
FIG. 5 shows an example of how a single multiscale ROM is created and used to produce temperature outputs at various points on-chip.

A summary and overview of an embodiment is shown in FIG. 5. This overview includes the characterization process 403 in which transient thermal step response training data for the set of ROMs is generated (e.g., in operation 53 of FIG. 2A). The training data is then used in ROM creation 405 to create the set of ROMs (ROMs 407). The set of ROMs 407 can then receive a time dependent power profile (chip power (time) 411) for the entire IC and select a set of tiles or points 401 to generate, through a power accounting process 409, a set of time dependent final temperature values 415 at each of the set of the set of tiles or points 401.

Figures 6B, 6C, 6D, 6E:
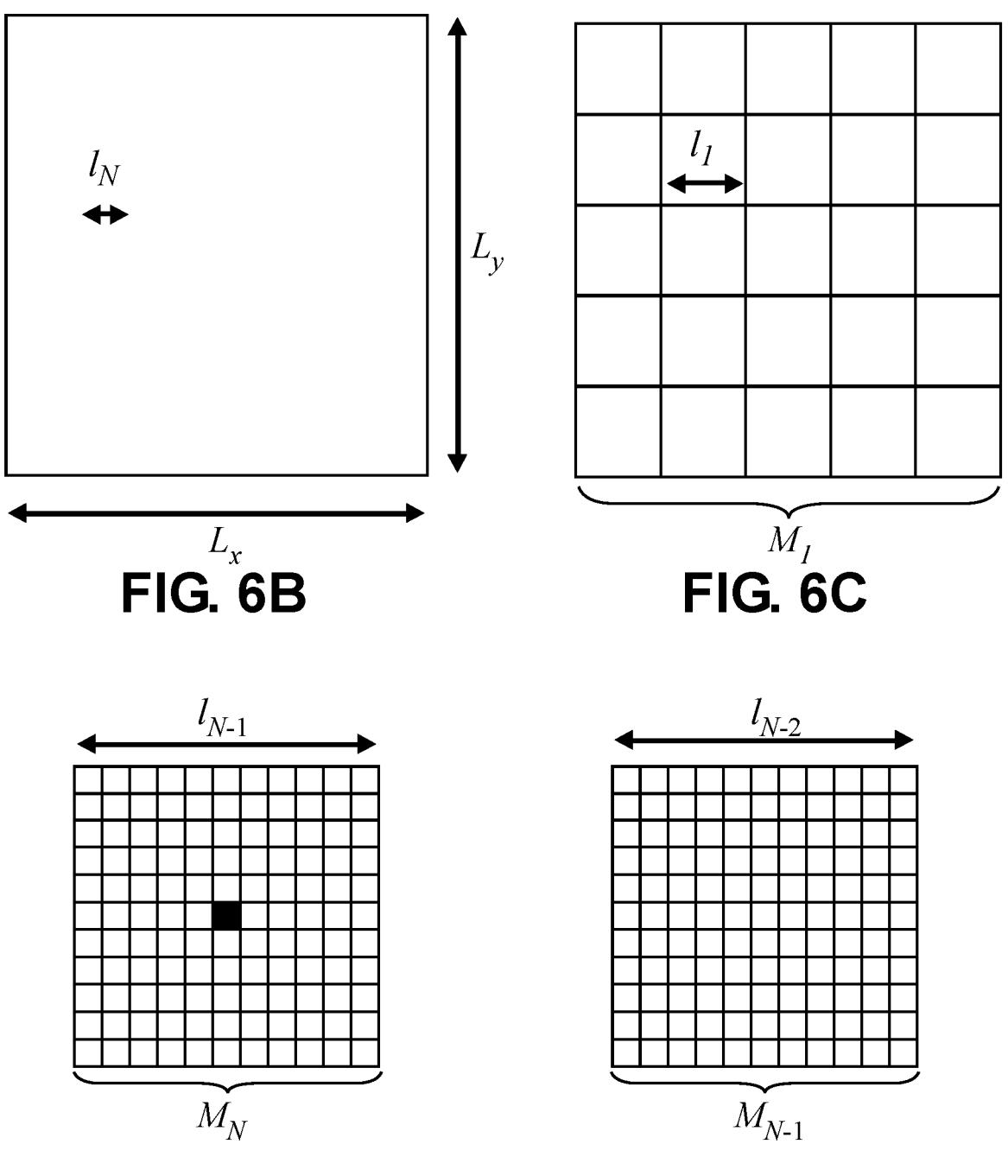
FIGS. 6B, 6C, 6D, 6E, 6F, 6G, 6H, and 6I show various stages of the method shown in FIG. 6A.
Figure 6F:
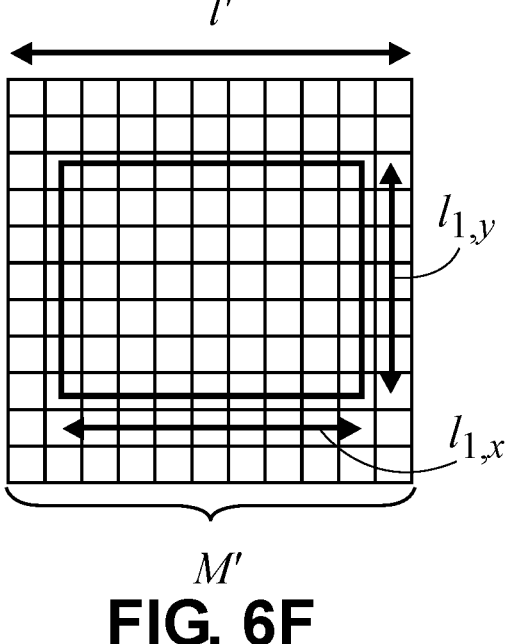
Figure 6G:
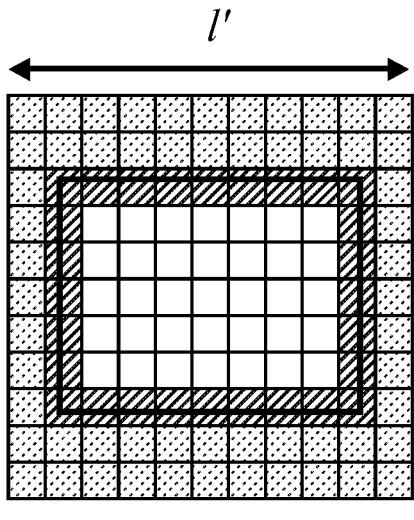
Figure 6H:
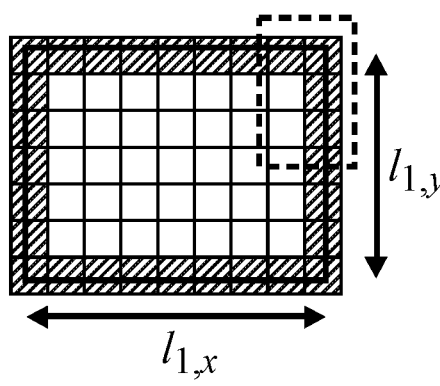
Figure 6I:
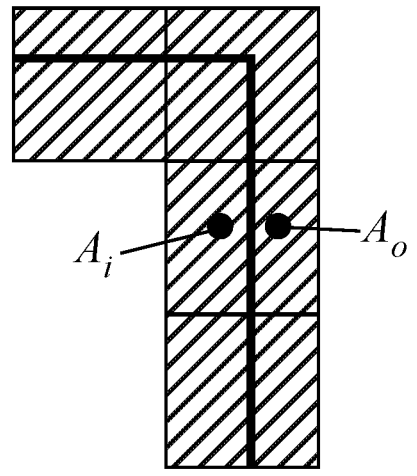

In one embodiment, a simulation data processing system can use a method to define the scales and resolutions used in the scales. The method can be performed automatically or with guidance from one or more circuit designers or completely manually by one or more circuit designers. This method can be used before performing a thermal characterization, such as the thermal characterization process in operation 53 in FIG. 2A. FIG. 6A shows an example of such a method. There are numerous other ways to define the scales and resolutions, so this example is to be understood as explanatory and not limiting. In the following description, it is assumed that a simulation system (a data processing system) performs the method with only guidance from the designer. In operation 451 in FIG. 6A, a data processing system can specify a fine grain tile resolution size IN of the Nth level or scale; see FIG. 6B. In operation 453, a data processing system specifies divisions at level 1, which sets of the length of a tile in level 1; see FIG. 6C. In operation 455, the data processing system creates an array of size $M_n$ for a given tile in level N, and this sets the array size of $1_{N-1}$ for level N−1; see FIG. 6D. In operation 457, the data processing system creates an array of size $M_{n-1}$ and determines an array size for level N−2; see FIG. 6E. This process is repeated (operation 459) until an array size at some point becomes greater than the level 1 array size; see FIG. 6F. In operation 461, the tiles that are completely outside of the level 1 array are cropped (see FIG. 6G) to create the level 2 array. For tiles in the level 2 array that overlap with the level 1 array border, their power is scaled by a factor of $A_i/(A_i + A_o)$; see FIGS. 6H and 6I.

Figure 7:
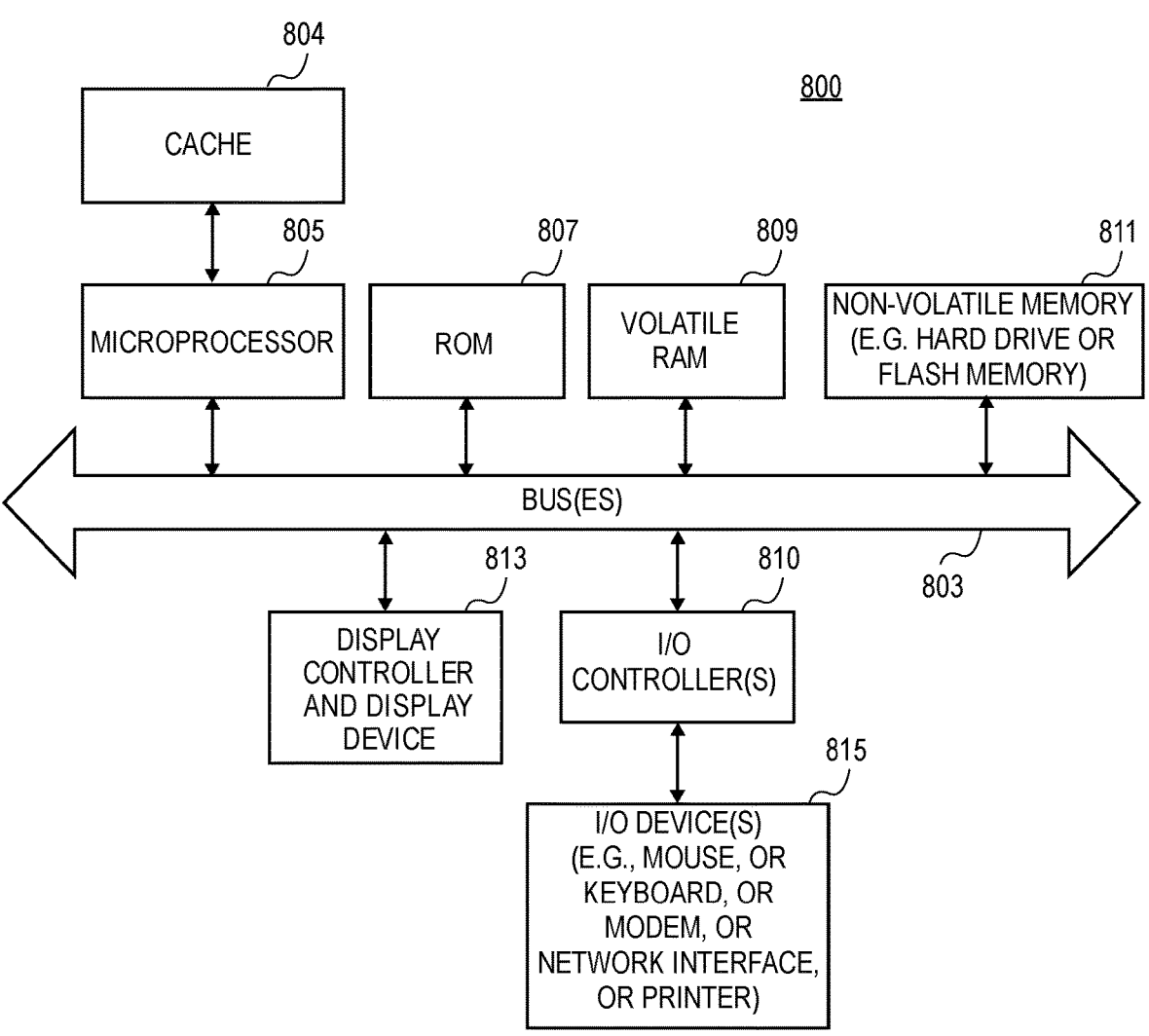
FIG. 7 shows an example of a data processing system that can be used to implement one or more embodiments described herein.

FIG. 7 shows one example of a data processing system 800, which may be used with one embodiment. For example, the system 800 may be implemented to provide a system or device that performs any one of the methods described herein. Thus, the system 800 is an example of a simulation system, and the system 800 can execute the simulation software described herein. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors)

designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A machine implemented method, the method comprising:
generating a set of thermal transient response training data for each of a set of scales over a model of one or more integrated circuits (ICs) in a package in a system;
generating, for each of the scales, a linear time-invariant (LTI) state-space reduced order model (ROM) from the generated set of thermal transient response training data for the scale, thereby producing a set of ROMs covering the set of scales, the set of ROMs collectively representing a multiscale ROM;
applying a simulated power as an input to each ROM in the set of ROMs to produce transient thermal data at each scale, wherein more than one of the set of ROMs have overlapping coverage areas with different scales, wherein a first processing core computes the transient thermal data for a first scale using a first ROM and a second processing core independently computes the transient thermal data for a second scale using a second ROM;
combining the transient thermal data at each scale to produce transient thermal data based on all of the ROMs in the set of ROMs.

2. The method as in claim 1, wherein the set of scales include a first scale having a first coverage of a first IC of the one or more ICs and a second scale having a second coverage of the first IC, and wherein the second scale is smaller than the first scale and covers less of the first IC than the first scale and has a higher resolution than the first scale.

3. The method as in claim 2, wherein the set of scales includes a third scale having a third coverage which covers the system, and wherein the third coverage includes each of the one or more ICs, and wherein a first resolution of the first scale is lower than a second resolution of the second scale.

4. The method as in claim 3, wherein the simulated power is a time varying power profile that is based on a time varying usage scenario of the system.

5. The method as in claim 3, wherein the training data is generated using inversion and symmetry properties of tiles in a plurality of scales in the set of scales to reduce computations required to generate the training data.

6. The method as in claim 5, wherein the training data is generated from a set of computational fluid dynamics (CFD) simulations, with one CFD simulation for each scale in the set of scales.

7. The method as in claim 3, wherein the simulated power is distributed across each of the scales and is conserved to avoid double counting of power across all of the scales.

8. The method as in claim 3, wherein the system includes a plurality of ICs that are thermally coupled in the set of scales.

9. The method as in claim 3, wherein generating each of the ROMs in the set of ROMs comprises a set of Eigensystem Realization Algorithm operations.

10. The method as in claim 6, wherein temperature data at each point on an IC in the one or more ICs is evaluated independently of and in parallel with evaluation of temperature data for other points on the IC.

11. A non-transitory machine readable medium storing executable program instructions which when executed by a data processing system cause the data processing system to perform a method, the method comprising:
generating a set of thermal transient response training data for each of a set of scales over a model of one or more integrated circuits (ICs) in a package in a system;
generating, for each of the scales, a linear time-invariant (LTI) state-space reduced order model (ROM) from the generated set of thermal transient response training data for the scale, thereby producing a set of ROMs covering the set of scales, the set of ROMs collectively representing a multiscale ROM;
applying a simulated power as an input to each ROM in the set of ROMs to produce transient thermal data at each scale, wherein more than one of the set of ROMs have overlapping coverage areas with different scales, wherein a first processing core computes the transient thermal data for a first scale using a first ROM and a second processing core independently computes the transient thermal data for a second scale using a second ROM;
combining the transient thermal data at each scale to produce transient thermal data based on all of the ROMs in the set of ROMs.

12. The non-transitory machine readable medium as in claim 11, wherein the set of scales include a first scale having a first coverage of a first IC of the one or more ICs and a second scale having a second coverage of the first IC, and wherein the second scale is smaller than the first scale and covers less of the first IC than the first scale and has a higher resolution than the first scale.

13. The non-transitory machine readable medium as in claim 12, wherein the set of scales includes a third scale having a third coverage which covers the system, and wherein the third coverage includes each of the one or more ICs, and wherein a first resolution of the first scale is lower than a second resolution of the second scale.

14. The non-transitory machine readable medium as in claim 13, wherein the simulated power is a time varying power profile that is based on a time varying usage scenario of the system.

15. The non-transitory machine readable medium as in claim 13, wherein the training data is generated using inversion and symmetry properties of tiles in a plurality of scales in the set of scales to reduce computations required to generate the training data.

16. The non-transitory machine readable medium as in claim 15, wherein the training data is generated from a set of computational fluid dynamics (CFD) simulations, with one CFD simulation for each scale in the set of scales.

17. The non-transitory machine readable medium as in claim 13, wherein the simulated power is distributed across each of the scales and is conserved to avoid double counting of power across all of the scales.

18. The non-transitory machine readable medium as in claim 13, wherein the system includes a plurality of ICs that are thermally coupled in the set of scales.

19. The non-transitory machine readable medium as in claim 13, wherein generating each of the ROMs in the set of ROMs comprises a set of Eigensystem Realization Algorithm operations.

20. The non-transitory machine readable medium as in claim 16, wherein temperature data at each point on an IC in the one or more ICs is evaluated independently of and in parallel with evaluation of temperature data for other points on the IC.

* * * * *